US011718172B1

(12) United States Patent
Engerman

(10) Patent No.: US 11,718,172 B1
(45) Date of Patent: Aug. 8, 2023

(54) MULTI-SPEED GEARBOX SYSTEM AND GEARBOX OPERATING METHOD

(71) Applicant: Dana Automotive Systems Group, LLC, Maumee, OH (US)

(72) Inventor: Eric M. Engerman, Novi, MI (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 17/660,586

(22) Filed: Apr. 25, 2022

(51) Int. Cl.
| *F16H 3/66* | (2006.01) |
| *B60K 17/04* | (2006.01) |
| *F16H 3/091* | (2006.01) |
| *F16H 3/10* | (2006.01) |
| *F16H 3/36* | (2006.01) |
| *F16H 3/089* | (2006.01) |

(52) U.S. Cl.
CPC .......... *B60K 17/046* (2013.01); *F16H 3/089* (2013.01); *F16H 3/091* (2013.01); *F16H 3/10* (2013.01); *F16H 3/363* (2013.01); *F16H 3/66* (2013.01); *F16H 2200/0021* (2013.01); *F16H 2200/201* (2013.01); *F16H 2200/2005* (2013.01); *F16H 2200/2007* (2013.01); *F16H 2200/2023* (2013.01); *F16H 2200/2035* (2013.01); *F16H 2200/2069* (2013.01); *F16H 2200/2084* (2013.01); *F16H 2200/2097* (2013.01)

(58) Field of Classification Search
CPC ..... F16H 2200/2007; F16H 2200/2035; F16H 2200/0021; F16H 3/089; B60K 17/046
See application file for complete search history.

(56) References Cited

U.S. PATENT DOCUMENTS

| 5,194,055 | A | * | 3/1993 | Oshidari | F16H 3/666 475/281 |
| 5,692,988 | A | * | 12/1997 | Beim | F16H 3/666 475/287 |
| 5,816,972 | A | * | 10/1998 | Park | F16H 3/66 475/284 |
| 5,836,850 | A | * | 11/1998 | Raghavan | F16H 3/666 475/286 |
| 8,944,949 | B2 | | 2/2015 | Mellet et al. | |
| 8,992,366 | B2 | | 3/2015 | Gassmann | |
| 9,453,564 | B1 | | 9/2016 | Pritchard et al. | |
| 9,637,127 | B1 | | 5/2017 | Cooper | |
| 10,533,640 | B2 | | 1/2020 | Littlefield et al. | |
| 2020/0096083 | A1 | * | 3/2020 | Waltz | B60K 1/02 |
| 2020/0278011 | A1 | * | 9/2020 | Torii | F16H 3/66 |

FOREIGN PATENT DOCUMENTS

| CN | 201672012 U | | 12/2010 | |
| CN | 105673783 A | * | 6/2016 | |
| DE | 102017006266 A1 | * | 1/2019 | ............... B60K 1/00 |

* cited by examiner

*Primary Examiner* — Stacey A Fluhart
(74) *Attorney, Agent, or Firm* — McCoy Russell LLP

(57) ABSTRACT

Methods and systems for a gearbox are provided. A multi-speed gearbox system in an electric vehicle includes, in one example, a planetary assembly designed to rotationally coupled to an electric machine and including a first planetary gear set that is rotationally coupled to a second planetary gear set that includes a first set of pinion gears and a second set of pinion gears. The multi-speed gearbox system further includes a first clutch designed to selectively ground a first component in one of the first planetary gear set and the second planetary gear set.

18 Claims, 4 Drawing Sheets

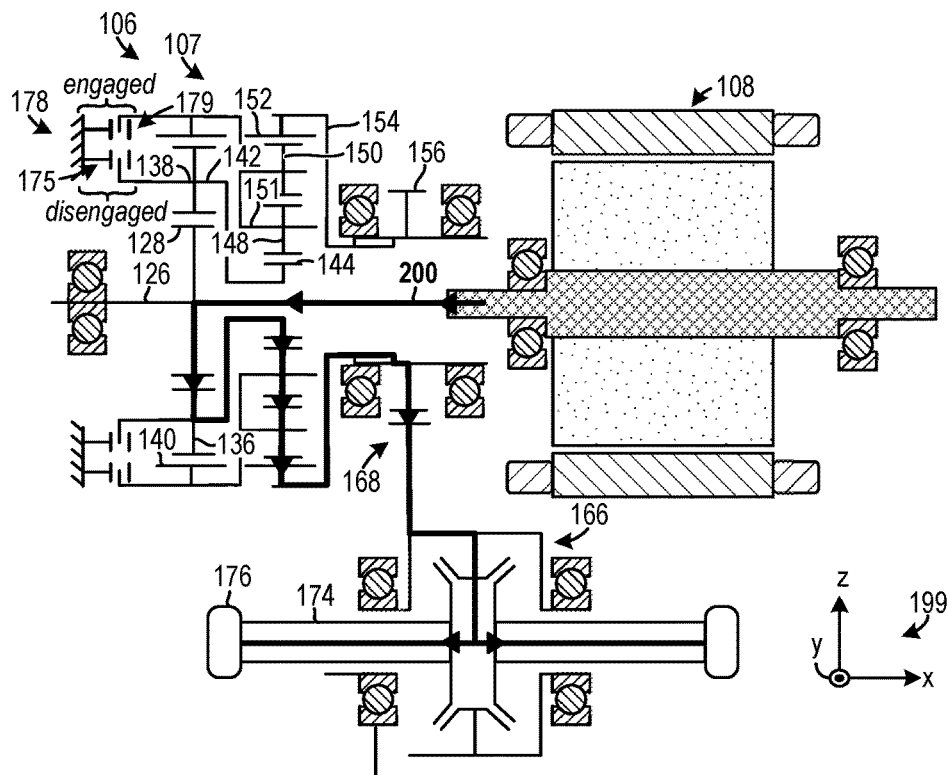
FIG. 2A
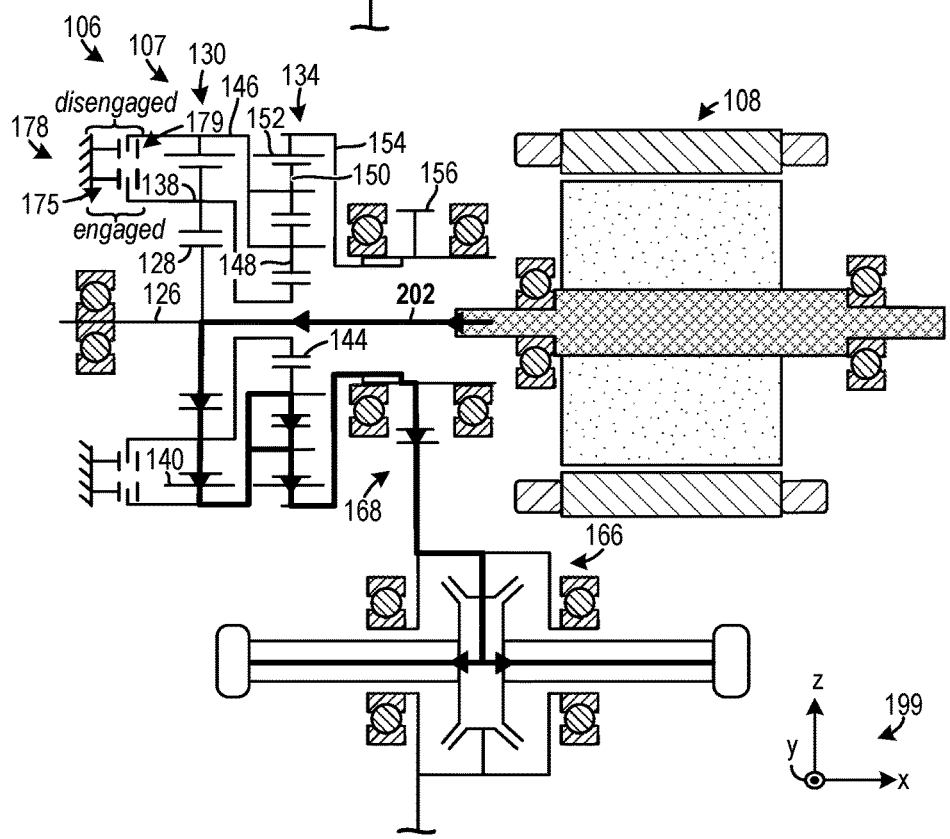
FIG. 2B
|  | First Gear | Second Gear |
|---|---|---|
| Clutch (175) | Disengaged | Engaged |
| Clutch (179) | Engaged | Disengaged |
FIG. 2C

MULTI-SPEED GEARBOX SYSTEM AND GEARBOX OPERATING METHOD

TECHNICAL FIELD

The present disclosure relates to an electric drive axle in a vehicle, and more particularly to a multi-speed gearbox for a drive axle.

BACKGROUND AND SUMMARY

Certain internal combustion engine vehicles have a wide range of gear ratio demands. For instance, specific vehicles, such as sport utility vehicles, can have high and low range gear ratio demands. For instance, some combustion engine vehicles may have both high and low speed travel demands, to allow the vehicle to travel on freeways as well as in off-road environments, for example. Other vehicles may however demand closer separation between gears to enable smoother shifting operation. The inventor has recognized a desire to meet these demands when electrifying certain vehicles.

In other vehicles, step ratio planetary transmissions are used to achieve a comparatively high number of gear ratios. The high number of gear ratios is achieved using at least three or four planetary gear sets. Using this number of planetary gear sets allows the rotational direction of the planetary inputs and outputs to be changed and corrected through the transmission as it goes through sequential stages. U.S. Pat. No. 8,944,949 B2 to Mellet et al. discloses an automatic transmission with three simple planetary gear sets and a compound planetary gear set in a hybrid powertrain. This step ratio transmission achieves nine forward drive speeds.

The inventor has recognized several drawbacks with Menet's transmission as well as other previous transmissions. For instance, Menet's transmission may have a lower efficiency and demand higher complexity manufacturing than transmission with less speeds. However, decreasing the complexity of the transmission by decreasing the number of planetary gear sets may pose barriers to achieving a desired gear ratio separation and a common direction of rotation given planetary gear set kinematic constraints. For instance, certain gear ratio combinations in multi-planetary arrangements may be incompatible with certain electric motors. Certain drivetrain designs have therefore made undesirable tradeoffs between the number of available gears, as well as drivetrain efficiency and complexity.

To overcome at least some of the aforementioned challenges the inventor developed a multi-speed gearbox system in an electric vehicle. The multi-speed gearbox system includes, in one example, a planetary assembly designed to rotationally couple to an electric machine. The planetary assembly includes a first planetary gear set that is rotationally coupled to a second planetary gear set. The second planetary gear set includes a first set of pinion gears and a second set of pinion gears. The system further includes a clutch assembly designed to selectively ground a first component in one of the first planetary gear set and the second planetary gear set. In this way, a desired balance may be struck between system efficiency, available gear ratios, and system complexity. Further, using a dual-pinion planetary gear set allows a desired separation between the gear ratios as well as a common rotational direction of the planetary gear sets to be achieved, if wanted. Consequently, the gearbox may achieve desired performance characteristics. For instance, due to the dual-pinion planetary arrangement the gearbox may be designed with a ratio separation that enables powershifting operation between the system's discrete operating gears, in one example. In another example, due to the dual-pinion planetary arrangement, the gearbox may be designed with an operator selectable lower range gear (e.g., suitable for driving in off-road environments) and a higher range gear (e.g., suitable for driving at higher speeds on high-speed roadways).

In another example, the multi-speed gearbox may include one clutch per operating gear ratio. For instance, the clutch assembly in the multi-speed gearbox may include a first clutch designed to selectively ground a first component in the first planetary gear set and a second clutch designed to selectively ground a second component in the first planetary gear set. In this example, the multi-speed gearbox may therefore be a two-speed gearbox. In this way, the system achieves a desired number of gear ratios without unduly increasing system complexity via the additional of extra planetary gear sets and/or clutches.

In yet another example, the first clutch and the second clutch may be friction clutches. In such an example, the clutches may be operated to powershift between the first and second gears. Consequently, torque interruptions during shifting transients may be decreased, thereby increasing vehicle driveability.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 2A-2B show power paths for different operating gears of the transmission system, depicted in FIG. 1.

FIG. 2C shows a table that indicates the configuration of the gearbox clutches in different operating gears shown in FIGS. 2A and 2B.

DETAILED DESCRIPTION

A gearbox system that has a space efficient clutching assembly and at least two speeds is described herein. The transmission system includes a planetary assembly with a dual-pinion planetary gear that includes a first and second set of pinions. The dual-pinion planetary gear set may be coupled in series with another planetary gear set (e.g., a simple planetary gear set). The gearbox may include a clutch assembly that is designed to ground two components in the first planetary gear set. Designing the gearbox with this planetary architecture and clutching arrangement allows the system to achieve a desired gear ratio separation, use a smaller number of clutches than other transmissions (e.g., use one clutch per gear ratio), achieve multiple gears that have a common rotational direction at the gearbox output, and use less planetary gear sets than other multi-speed gearboxes.

Figure 1:
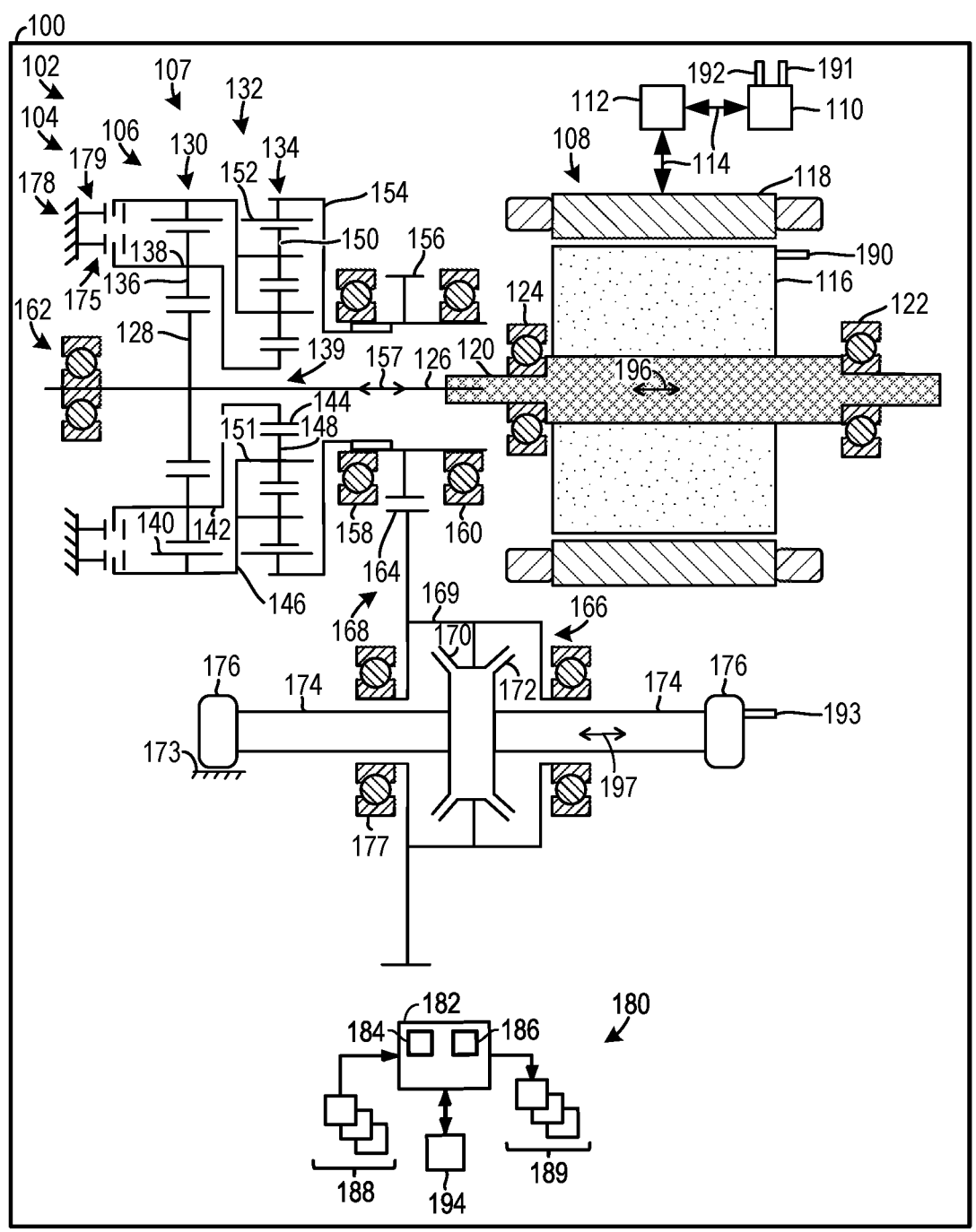
FIG. 1 shows a schematic representation of a vehicle including a first embodiment of a transmission system.
Figure 3:
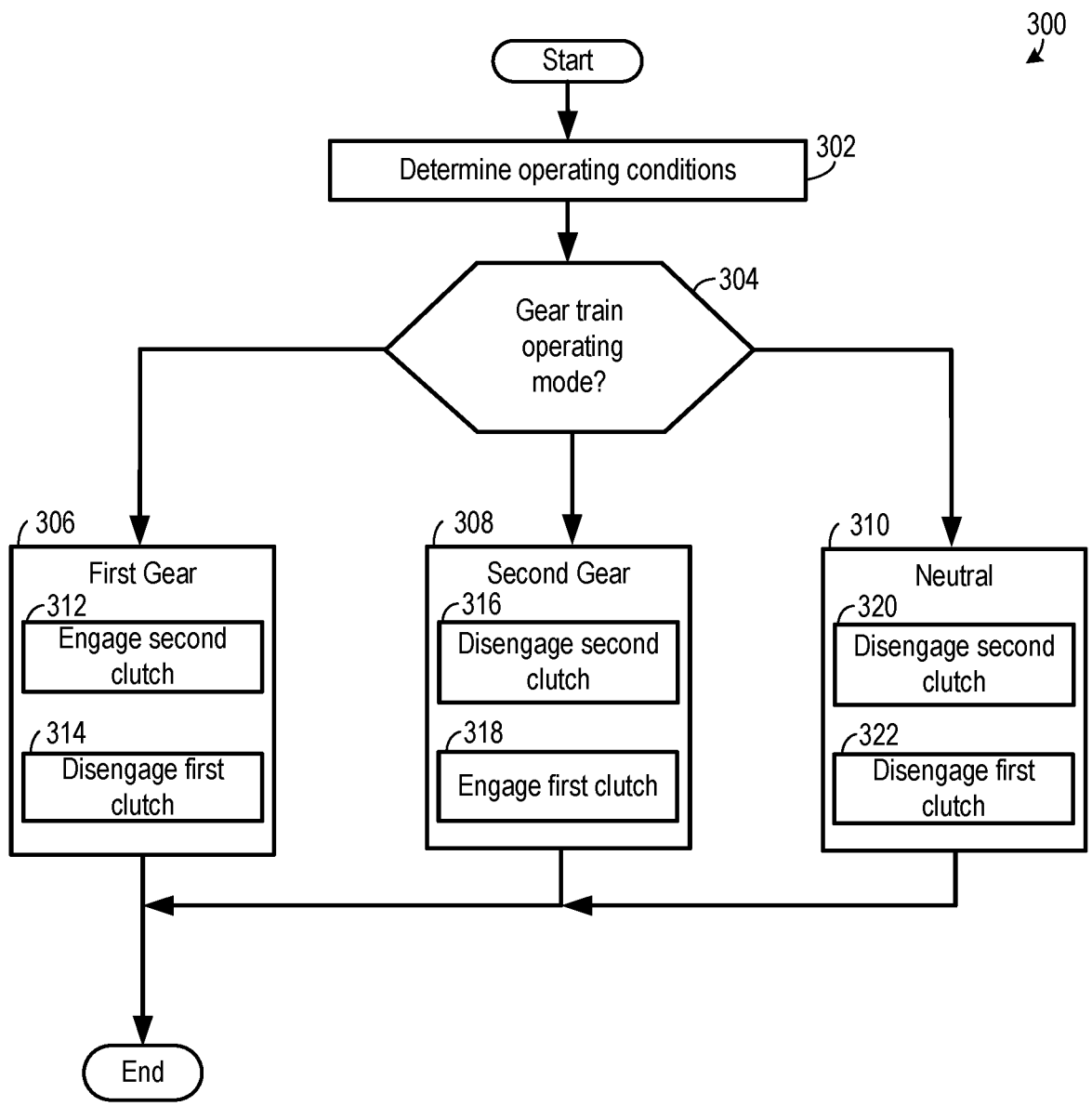
FIG. 3 shows a method for controlling a gearbox system.
Figure 4:
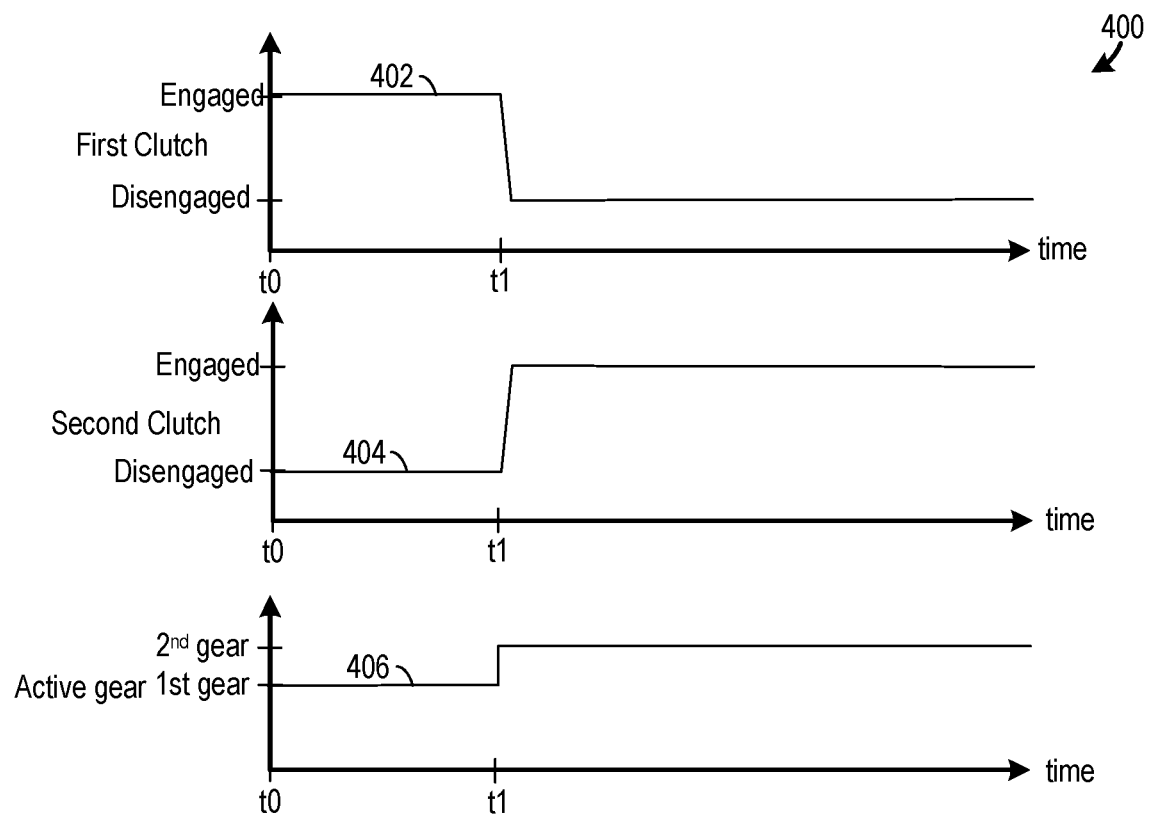
FIG. 4 shows a timing diagram of a use-case gearbox control strategy.

FIG. 1 schematically illustrates a vehicle with a first embodiment of a transmission with a gearbox system that is designed with multiple gear ratios. FIGS. 2A-2B illustrate the power paths in different gears in the gearbox system, facilitating the use of multiple discrete gear ratios in a compact arrangement. FIG. 2C depicts a chart corresponding to the configurations of the clutches in the different gears in the gearbox system. FIG. 3 shows a method for shifting between the different gears using a compact clutch arrangement. FIG. 4 illustrates a timing diagram for a use-case transmission operating strategy for seamlessly shifting between two active gears.

FIG. 1 shows a vehicle 100 with a powertrain 102. The vehicle 100 is an electric vehicle (EV) such as an all-electric vehicle (e.g., a battery electric vehicle) or a hybrid electric vehicle. In the hybrid vehicle embodiment an engine may be included in the powertrain and in the all-electric vehicle embodiment an engine may be omitted from the powertrain.

The powertrain 102 includes an electric machine 108 (e.g., an electric motor-generator) and a transmission 104 with a gearbox system 106. The gearbox system 106 includes a gearbox 107 that may include planetary gear sets and a clutch assembly described in greater detail herein. The stick diagram of FIG. 1 provides a topology of the vehicle, transmission, and corresponding components. Furthermore, the system 106 shown in FIG. 1 may be used in an electric drive axle. To elaborate, the system may be used in a beam axle. A beam axle may be an axle with mechanical components structurally supporting one another and extending between drive wheels. For instance, the beam axle may be a structurally continuous axle spanning the drive wheels on a lateral axis, in one embodiment. Thus, wheels coupled to the axle may move in unison when articulating, during, for example, vehicle travel on uneven road surfaces. The beam axle may be coupled to a dependent suspension system, in one example. In such an example, the camber angle of the wheels may remain substantially constant as the suspension moves through its travel.

The electric machine 108 is electrically coupled to an energy storage device 110 (e.g., traction battery, capacitor, combinations thereof, and the like) via an inverter 112, for example. As such, the electric machine 108 may be an alternating current (AC) electric machine, in one example. However, in other examples, the electric machine may be a direct current (DC) electric machine and the inverter may therefore be omitted from the powertrain, in such an example. Arrows 114 signify the energy transfer between the electric machine 108, the inverter 112, and the energy storage device 110 that may occur during different modes of system operation. The electric machine 108 may include conventional components for generating rotational output (e.g., forward and reverse drive rotational output) and/or electrical energy for recharging the energy storage device 110 such as a rotor 116 that electromagnetically interacts with a stator 118, to provide the aforementioned energy transfer functionality.

The electric machine 108 includes a rotor shaft 120 with a first bearing 122 and a second bearing 124 coupled thereto. The bearings 122, 124 as well as the other bearings described herein may include components such as inner races, outer races, roller elements (e.g., ball bearings, cylindrical rollers, tapered cylindrical rollers, and the like). It will be appreciated that the size and/or construction of the bearings may be selected based on expected rotational speeds of the components to which they are attached, packaging constraints, and the like. As such, the size and/or configuration of at least a portion of the bearings may vary, in some cases. However, at least a portion of the bearings may have similar sizes and/or constructions.

The bearings 122, 124 are shown positioned external to the rotor 116. However, other bearing arrangements with regard to the electric machine have been contemplated such as arrangements with alternative quantities, types, and/or locations of bearings.

The first gear and the second gear in the gearbox system may enable the electric vehicle to operate at higher speeds (e.g., freeway speeds, in one use-case example) and lower speeds (e.g., crawl speeds for off-road driving, in one use-case example). Further, the separation between the ratios associated with the first gear and the second gear may be approximately between 1.6 and 1.8, in one use-case example, to provide smooth shifting and high numerical ratios.

The rotor shaft 120 is rotationally coupled (e.g., directly rotationally coupled) to a shaft 126 in the gearbox system 106. Directly rotationally coupling the rotor shaft to the gearbox shaft enables the system's compactness to be increased. The shaft 126 may have a bearing coupled thereto to facilitate rotation thereof. A sun gear 128 may be fixedly coupled to the shaft 120 and therefore rotates therewith. The sun gear 128 is included in a planetary gear set 130 (e.g., a simple planetary gear set) that is included in a planetary assembly 132. The planetary assembly 132 may further include a dual-pinion planetary gear set 134 that may be coupled in series with the planetary gear set. As such, the planetary gear sets in the planetary assembly 132 may be arranged coaxial to one another, to increase gearbox compactness, in one example. The planetary gear set 130 may be referred to as a first planetary gear set and the dual-pinion planetary gear set 134 may be referred to as a second planetary gear set. Further, in one specific example, the planetary assembly 132 may include solely the planetary gear set 130 and the dual-pinion planetary gear set 134. However, in alternate embodiments, the planetary assembly may include additional planetary gear sets.

The sun gear 128 meshes with planet gears 136 that are designed to rotate on a carrier 138. Bearings, such as needle roller bearings, may be used to allow the rotation of the planet gears 136 on the carrier 138 as well as the other planet gears described herein. The shaft 126 may extend through a central opening 139 in the sun gear 128. In this way, the compactness of the gearbox system may be increased. The planet gears 136 mesh with a ring gear 140.

The carrier 138 may include an extension 142 that rotationally couples the carrier to a sun gear 144 in the dual-pinion planetary gear set 134. In this way, a rigid connection may be formed between the carrier 138 and the sun gear 144 to allow rotational energy to be transferred therebetween. Further, the ring gear 140 may include an extension 146 that rotationally couples the ring gear to a first set of planet gears 148 and a second set of planet gears 150 via a carrier 151. The first and second sets of planet gears mesh with one another and are included in the dual-pinion planetary gear set 134. Thus, the extension 146 provides a rigid connection between the ring gear 140 and the sets of planet gears 148 and 150, The dual-pinion planetary gear set 134 further includes a ring gear 152 with an extension 154 that is coupled to an output gear 156. It will be understood that the output gear 156 functions as an output in a drive mode. However, during a regeneration mode, where the electric machine 108 generates electricity, the output gear 156 may function as an input of the planetary assembly 132. As illustrated, the output gear 156 is coaxial to the planetary assembly 132. However, in other examples, the output gear 156 may be positioned off-axis from the rotational axis 157 of the planetary assembly 132. Positioning the output gear coaxial to the planetary assembly may increase gearbox compactness. However, the output gear may be positioned off-axis from the planetary assembly 132 to achieve a desired gearbox drop which may be desired for some vehicle platforms. Further, bearings 158 and 160 may support and facilitate rotation of the output gear 156.

The output gear 156 may be positioned axially between the planetary assembly 132 and the electric machine 108, to increase gearbox compactness. However, in alternate arrangements, the output gear 156 may be positioned axially outboard of the planetary assembly 132 on an outer axial side 162 of the assembly. Further, the dual-pinion planetary gear set 134 may be positioned axially between the planetary gear set 130 and the electric machine 108 to decrease the gearbox's length along the x-axis. However, other positions of the dual-pinion planetary gear set have been contemplated.

The output gear 156 may mesh with a gear 164 in a differential 166. This gear mesh may form a final drive ratio 168. However, in other examples, the system may include additional gearing between the gearbox and the differential. The gear 164 may be formed in or fixedly coupled to a case 169 of the differential 166. The case 169 may drive rotation of spiders gears 170 which mesh with side gears 172. The side gears 172 may be rotationally coupled to axle shafts 174. In turn, the axle shafts 174 are rotationally coupled to drive wheels 176 that are on a drive surface 173. Bearings 177 may support and enable rotation of the differential case 169. The differential may be an open differential, in one example. In other examples, a locking differential, a limited slip differential, or a torque vectoring differential may be used in the gearbox.

A clutch assembly 178 designed to shift the gearbox system 106 between multiple active gear ratios. To elaborate, the clutch assembly 178 may include a first clutch 175 and a second clutch 179, in one example. In such an example, the first clutch 175 may be designed to selectively ground the carrier 138 and the second clutch 179 may be designed to ground the ring gear 140. As such, the first clutch 175 and the second clutch 179 may each be friction clutches (e.g., wet friction clutches) with friction plates and separator plates to enable selective grounding of the carrier 138 and the ring gear 140. Friction clutches enable smooth torque transfer during shifting transients to be achieve with a decreased amount of torque interruptions. As such, in the friction clutch embodiment, the gearbox may be powershifted between the first gear and the second gear. The system's powershifting strategy is described in greater detail herein. In an alternate example, the clutch assembly 178 may include a dual position dog clutch that is designed to selectively ground the ring gear 140 and the carrier 138 during different operating conditions. For instance, the dog clutch may include a splined or toothed surfaces designed to engage splined or toothed surfaces in both the ring gear 140 and the carrier 138 to operate the gearbox in different gear ratios. As described herein grounding a gear or other planetary gear set component involves inhibiting rotation of said gear or component.

For operation of the gearbox 107 in the first gear, the second clutch 179 may be engaged and the first clutch 175 may be disengaged. Clutch engagement denotes grounding of the planetary component associated with the clutch and disengagement denotes the opposite. As such, in the first gear, when the second clutch 179 is engaged, the sun gear 128 drives the carrier 138 of the planetary gear set 130 which may be in the same rotational direction as the input from the electric machine 108. Further, in the first gear, the carrier 138 of the planetary gear set 130 drives the sun gear 144 of the dual-pinion planetary gear set 134. Still further, the carrier 151 of the dual-pinion planetary gear set 134 is fixed through the ring gear 140 of the first planetary gear set, which in-turn enables the first and second sets of planet gears 148, 150 to drive the ring gear 152 of the dual-pinion planetary gear set 134, in the opposite direction of the input rotation, for instance.

For operation of the gearbox 107 in the second gear, the first clutch 175 may be engaged and the second clutch 179 may be disengaged. When the first clutch is engaged, the ring gear 140 of the planetary gear set 130 is driven vis the planet gears 136 in an opposite direction of the input rotation from the electric machine 108. This drive the carrier 151 of the dual-pinion planetary gear set 134 since the sun gear 144 of the dual-pinion planetary gear set 134 is fixed through the carrier 138 of the planetary gear set 130. The ring gear 152 of the dual-pinion planetary gear set 134 may be driven in the direction opposite of the input from the electric machine 108.

The vehicle 100 may also include a control system 180 with a controller 182. The controller 182 includes a processor 184 and memory 186. The memory 186 may hold instructions stored therein that when executed by the processor cause the controller 182 to perform the various methods, control techniques, and the like described herein. The processor 184 may include a microprocessor unit and/or other types of circuits. The memory 186 may include known data storage mediums such as random access memory, read only memory, keep alive memory, combinations thereof, and the like. The memory 186 may include non-transitory memory.

The controller 182 may receive various signals from sensors 188 positioned in different locations in the vehicle 100 and the gearbox system 106. The sensors may include an electric machine speed sensor 190, an energy storage device temperature sensor 191, an energy storage device state of charge sensor 192, wheel speed sensors 193, a gearbox speed sensor, and the like. The controller 182 may also send control signals to various actuators 189 coupled at different locations in the vehicle 100 and the gearbox system 106. For instance, the controller 182 may send signals to the inverter 112 to adjust the rotational speed and/or direction of the electric machine. The controller 182 may also send signals to the clutch assembly 178 (e.g., the first clutch 175 and the second clutch 179) to shift into different active gears (e.g., a first gear or a second gear). For instance, the second clutch 179 may be engaged and the first clutch 175 may be disengaged to place the gearbox in the first gear. Actuators (e.g., hydraulic actuators, pneumatic actuators, electromechanical actuators, combinations thereof, and the like) in the clutches may be used for clutch engagement and disengagement. The other controllable components in the vehicle and gearbox system may function in a similar manner with regard to command signals and actuator adjustment.

The vehicle 100 may also include an input device 194 (e.g., a gear selector such as a gear stick, gear lever, and the like, console instrument panel, touch interface, touch panel, keyboard, combinations thereof, and the like). The input device 194, responsive to driver input, may generate a gear request indicating a desired gear ratio for the transmission. For instance, in a use-case example, the driver may shift a gear selector into a gear (e.g., a first gear or a second gear) to generate a gearshift request at the controller. In response, the controller commands transmission components (e.g., the first clutch 175 and the second clutch 179) to initiate a transition into a first gear. Other gear shifting transients may occur in a similar fashion. However, mechanical gearshift strategies as well as automatic shifting strategies have also been envisioned. Subsequent to an operator shifting the gear selector into a drive mode, the controller may automatically place the transmission in the first gear or the second gear based on vehicle speed and/or load, for example. The gearbox system 106 may also be operated in a regeneration mode and a reverse mode. In the regenerative mode, energy is extracted from the transmission using the electric machine 108 and transferred to the energy storage device 110, for example. For instance, the electric machine 108 may be placed in a generator mode where at least a portion of the rotational energy transferred from the drive wheels to the generator by way of the transmission is converted into electrical energy.

The gearbox system 106 which makes use of the dual-pinion planetary gear set 134 described herein with regard to FIG. 1 is able to achieve a desired ratio separation, a decreased amount of clutches (e.g., one clutch per gear ratio), and a common rotational direction for the first and second gears, if so desired. Consequently, the gearbox is able to achieve desired performance characteristics in a compact and less complex package than previous transmissions.

An axis system 199 is provided in FIG. 1, as well as FIGS. 2A-2B, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples. A rotational axis 196 of the electric machine 108 as well as a rotational axis 197 of the axle shafts 174 are further provided for reference.

FIGS. 2A-2B depict mechanical power paths 200 and 202, respectively through the gearbox system 106 of the transmission 104 operating in the first gear and the second gear, respectively. FIG. 2C depicts the configuration of the first clutch 175 and the second clutch 179 in the first and second gears. As shown in FIG. 2C, in the first gear, the first clutch is disengaged and the second clutch is engaged to ground the ring gear 140. Conversely, in the second gear, the first clutch 175 is engaged to ground the carrier 138 and the second clutch 179 is disengaged. However, as previously discussed the clutch assembly may include a dog clutch designed to ground the carrier 138, in a first position, and ground the ring gear 140 in a second position.

As shown in FIG. 2A, in the first gear, the system's power path 200 unfolds as follows: power is first transferred from the electric machine 108 to the shaft 126. Next the power path moves from the shaft 126 to the sun gear 128. From the sun gear 128 the power path moves to the planet gears 136 and then to the carrier 138. Next, the power path moves from the carrier 138 to the sun gear 144 via the extension 142. From the sun gear 144 the power path moves to the first set of planet gears 148 and then to the second set of planet gears 150. Next, the power path moves from the second set of planet gears 150 to the ring gear 152 and from the ring gear to the output gear 156 via the extension 154. Next the power path moves to the differential 166 via the final drive ratio 168. From the differential 166 the power moves to the axle shafts 174 and then to the drive wheels 176. The power path from the output gear 156 to the drive wheels 176 in the first gear is similar to the second gear and repeated description is omitted for concision.

As shown in FIG. 2B, in the second gear, the system's power path 202 unfolds as follows: power is first transferred from the electric machine 108 to the shaft 126. Next the power path moves from the shaft 126 to the sun gear 128. From the sun gear 128 the power path moves to the planet gears 136 and then to the ring gear 140. To elaborate, the sun gear 128 of the planetary gear set 130 drives the ring gear 152 of the dual-pinion planetary gear set 134 through the fixed carrier 138 in the opposite direction of the sun input but may have a ratio of the ring gear 140 divided by the sun gear 128. Next, the power path moves from the ring gear 140 to carrier 151 via the extension 146. Next, the power path moves from the second set of planet gears 150 to the ring gear 152 and from the ring gear to the output gear 156. It will be understood, that grounding the carrier 138 induces grounding of the sun gear 144. The rotational input provided to the dual-pinion planetary gear set 134 from the extension 146 is opposite to that of the rotational input provided to the dual-pinion planetary gear set in the first gear. However, the rotational direction of the output gear 156 is the same in the first gear and the second gear. Consequently, convoluted gearing for correcting opposing rotational directions in the first and second gears may be avoided.

To shift between the first and second gears, when friction clutches are used in the gearbox, one clutch may be engaged while the other clutch is disengaged to enable a smooth torque handoff with a decreased amount of torque interruption (e.g., substantially no torque interruption). Consequently, the gearbox's performance may be increased. In such an example, the gearshift may take place while the vehicle speed is greater than zero or while the vehicle is stationary.

In the dog clutch embodiment, to shift between the first and second gears, the vehicle speed may be brought to a stationary state where the vehicle speed is zero or approaching zero. While the vehicle is stationary, the dog clutch may be transition from its first position where the carrier 138 is grounded to its second position where the ring gear 140 is grounded or vice versa.

FIG. 3 shows a method 300 for operation of a gearbox system. The method 300 specifically corresponds to operation of the gearbox system 106, shown in FIGS. 1 and 2A-2B. As such, the gearbox is described with regard to the dual friction clutch arrangement. However, the method 300 may be carried via other suitable systems, in other examples, such as a gearbox system which includes a dual-position dog clutch, as previously discussed. In such an example, the dog clutch may be transitioned between grounding the ring gear and the carrier in the first planetary gear set (e.g., the planetary gear set 130, shown in FIG. 1). Furthermore, the method 300 may be implemented by a controller that includes a processor and memory, as previously discussed.

At 302, the method comprises determining operating conditions. The operating conditions may include input device position (e.g., gearshift lever position), clutch configuration, transmission speed, motor speed, vehicle speed, vehicle load, ambient temperature, and the like. The operating conditions may be ascertained via sensor inputs, modeling, look-up tables, and other suitable techniques.

Next at 304, a determination is made to select an active gear for the system. Such as determination may be carried out responsive to driver input. For instance, the driver may interact with a gear selector or other suitable input device to transition the system into the one of the two active gears. However, automatic shifting strategies may be used, in other examples. For instance, transition into the different gears may be implemented based on vehicle speed and/or load. The active gears may be selected from a group of two gears, as previously discussed.

Block 304 may make a determination to shift the gearbox into a first gear at 306, a second gear at 308, or a neutral configuration at 310. If a determination is made to transition into the first gear, the method includes at 312 engaging the second clutch and at 314 disengaging the first clutch. Conversely, if a determination is made to transition into the second gear, the method includes at 316 disengaging the second clutch and at 318 engaging the first clutch. Further, if a determination is made to transition the gearbox into a neutral configuration, the method includes at 320 disengaging the second clutch and at 322 disengaging the first clutch. Method 300 allows the gearbox which may include a single clutch per gear ratio, to efficiently shift between active discrete gears. Consequently, the gearbox's performance may be increased.

FIG. 4 illustrates a timing diagram 400 of a use-case control strategy for a gearbox system, such as the gearbox system shown in FIGS. 1-2B. In each graph of the timing diagram, time is indicated on the abscissa and increases from left to right. The ordinates for plots 402 and 404 indicate the operational states (i.e., "Engaged" and "Disengaged") of the first and second clutches (e.g., clutch 175 and clutch 179, respectively). The ordinate for plot 406 indicate the system's active gear.

At t1, the gearbox is shifted from the first gear to the second gear. During this shifting transient, the second clutch is disengaged and the first clutch is engaged. It will be understood that the specific clutch control strategy may be more nuanced, in practice. For instance, clutch pressure in the second clutch may be less abruptly ramped up to allow a smoother transition into the second gear to unfold and reduce the likelihood of unwanted noise, vibration, and harshness (NVH) occurring during the gear shift. To elaborate, the clutch pressure of one clutch may be ramped up while pressure in another clutch is ramped down or vice versa to provide smoother and uninterrupted transmission power flow.

The technical effect of the gearbox systems and operating methods herein is to efficiently transition between the gearbox's discrete gears with a decreased amount of power interruption and/or provide a technique which allows the gearbox to achieve a higher gear ratio for lower speed operation and a lower gear ratio for higher speed operation in a space efficient package.

The gearbox system including the planetary assembly with the dual-pinion planetary gear set described herein allows the powertrain to use one motor, if desired, and achieve compactness in the fore to aft direction.

FIGS. 1-2B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, a multi-speed gearbox system in an electric vehicle is provided that comprises a planetary assembly designed to rotationally couple to an electric machine and including a first planetary gear set that is rotationally coupled to a second planetary gear set that includes a first set of pinion gears and a second set of pinion gears; a clutch assembly designed to selectively ground a first component in one of the first planetary gear set and the second planetary gear set.

In another aspect, a method for operation of a multi-speed gearbox system in an electric vehicle is provided that comprises: in a first gear, grounding a first component in a first planetary gear set of a planetary assembly; and in a second gear, grounding a second component in the first planetary gear set; wherein the multi-speed transmission system comprises: the planetary assembly designed to rotationally couple to an electric machine and including the first planetary gear set rotationally coupled to a second planetary gear set that includes a first set of pinion gears and a second set of pinion gears.

In yet another aspect, a multi-speed gearbox system in an electric axle is provided that comprises a planetary assembly designed to rotationally couple to an electric machine and including a first planetary gear set rotationally coupled to a second planetary gear set that includes a first set of pinion gears and a second set of pinion gears; a clutch assembly designed to selectively ground at least one of a carrier and a ring gear in the first planetary gear set.

In any of the aspects or combinations of the aspects, the clutch assembly may include a dog clutch designed to selectively ground the first component and a second component in one of the first planetary gear set and the second planetary gear set.

In any of the aspects or combinations of the aspects, the clutch assembly may include a first clutch designed to selectively ground a component in the first planetary gear set; and a second clutch designed to selectively ground a second component in the first planetary gear set.

In any of the aspects or combinations of the aspects, the first component may be a ring gear in the first planetary gear set and the second component is a carrier in the first planetary gear set.

In any of the aspects or combinations of the aspects, the ring gear may be rotationally coupled to the first set of pinion gears and the second set of pinion gears.

In any of the aspects or combinations of the aspects, the first clutch and the second clutch may be friction clutches.

In any of the aspects or combinations of the aspects, the multi-speed gearbox may include one clutch per operating gear ratio.

In any of the aspects or combinations of the aspects, the second planetary gear set includes a ring gear that is rotationally coupled to a differential.

In any of the aspects or combinations of the aspects, the ring gear may be rotationally coupled to the differential via a final drive ratio.

In any of the aspects or combinations of the aspects, the differential may be axially offset from the planetary assembly.

In any of the aspects or combinations of the aspects, the multi-speed transmission system may be a two-speed transmission system.

In any of the aspects or combinations of the aspects, the first and second components in the first planetary gear set may be grounded via operation of a dog clutch.

In any of the aspects or combinations of the aspects, the first component may be grounded via operation of a first clutch and the second component is grounded via operation of a second clutch.

In any of the aspects or combinations of the aspects, the first and second clutches may be friction clutches.

In any of the aspects or combinations of the aspects, the clutch assembly may be designed to selectively ground both the carrier and the ring gear in a first gear mode and a second gear mode, respectively.

In any of the aspects or combinations of the aspects, the clutch assembly may include: a first clutch that grounds the carrier of the first planetary gear set in a first gear mode; and a second clutch designed to selectively ground the ring gear of the first planetary gear set in a second gear mode.

In any of the aspects or combinations of the aspects, the ring gear may be coupled to the first set of pinion gears and the second set of pinion gears.

In any of the aspects or combinations of the aspects, the second planetary gear set may include a ring gear that is rotationally coupled to a differential via a final drive ratio.

In another representation, a two-speed transmission is provided that comprises a multi-pinion planetary gear set coupled in series with a simple planetary gear set and a clutch system designed to selectively ground two components in the simple planetary gear set.

As used herein, the term "approximately" is construed to mean plus or minus five percent of the range unless otherwise specified.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other vehicle hardware. The specific routines described herein may represent one or more of multiple processing strategies. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle control system, where the described actions are carried out by executing the instructions in a system including the various hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines. The subject matter of the present disclosure includes all novel and non-obvious combinations and sub-combinations of the various systems and configurations, and other features, functions, and/or properties disclosed herein. While various embodiments have been described above, it should be understood that they have been presented by way of example, and not limitation. The embodiments described above are therefore to be considered in all respects as illustrative, not restrictive.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A multi-speed gearbox system in an electric vehicle, comprising:
    a planetary assembly designed to rotationally couple to an electric machine and including a first planetary gear set that is rotationally coupled to a second planetary gear set that includes a first set of pinion gears and a second set of pinion gears; and
    a clutch assembly designed to selectively ground a first component in one of the first planetary gear set and the second planetary gear set;
    wherein a rotor shaft of the electric machine is directly coupled to a first sun gear in the first planetary gear set via a shaft that extends through a central opening in a second sun gear of the second planetary gear set; and
    wherein the second planetary gear set includes a ring gear that is rotationally coupled to a differential.

2. The multi-speed gearbox system of claim 1, wherein the clutch assembly includes a dual-position dog clutch that is designed to selectively ground the first component and a second component in one of the first planetary gear set and the second planetary gear set.

3. The multi-speed gearbox system of claim 1, wherein the clutch assembly includes:
    a first clutch designed to selectively ground a component in the first planetary gear set; and
    a second clutch designed to selectively ground a second component in the first planetary gear set.

4. The multi-speed gearbox system of claim 3, wherein the first component is a ring gear in the first planetary gear set and the second component is a carrier in the first planetary gear set.

5. The multi-speed gearbox system of claim 4, wherein the ring gear in the first planetary gear set is rotationally coupled to the first set of pinion gears and the second set of pinion gears.

6. The multi-speed gearbox system of claim 3, wherein the first clutch and the second clutch are friction clutches.

7. The multi-speed gearbox system of claim 3, wherein the multi-speed gearbox system includes one clutch per operating gear ratio.

8. The multi-speed gearbox system of claim 1, wherein the ring gear is rotationally coupled to the differential via a final drive ratio.

9. The multi-speed gearbox system of claim 1, wherein the differential is axially offset from the planetary assembly.

10. The multi-speed gearbox system of claim 1, wherein the multi-speed gearbox system is a two-speed gearbox system.

11. A method for operation of a multi-speed gearbox system in an electric vehicle, comprising:
   in a first gear, grounding a ring gear in a first planetary gear set of a planetary assembly through operation of a first clutch; and
   in a second gear, grounding a carrier in the first planetary gear set through operation of a second clutch;
   wherein the multi-speed gearbox system comprises:
      the planetary assembly designed to rotationally couple to an electric machine and including the first planetary gear set rotationally coupled to a second planetary gear set that includes a first set of pinion gears and a second set of pinion gears;
   wherein a rotor shaft of the electric machine is directly coupled to a first sun gear in the first planetary gear set via a shaft that extends through a central opening in a second sun gear of the second planetary gear set; and
   wherein the ring gear in the first planetary gear set is rotationally coupled to the first set of pinion gears and the second set of pinion gears in the second planetary gear set.

12. The method of claim 11, wherein the first clutch is a dog clutch.

13. The method of claim 12, wherein the second clutch is a dog clutch.

14. The method of claim 13, wherein the first and second clutches are friction clutches.

15. A multi-speed gearbox system in an electric axle, comprising:
   a planetary assembly designed to rotationally couple to an electric machine and including a first planetary gear set rotationally coupled to a second planetary gear set that includes a first set of pinion gears and a second set of pinion gears; and
   a clutch assembly including:
      a first clutch that selectively grounds a carrier; and
      a second clutch that selectively grounds a ring gear in the first planetary gear set;
      wherein the first and the second clutches are the only clutches in the multi-speed gearbox system;
   wherein a rotor shaft of the electric machine is directly coupled to a first sun gear in the first planetary gear set via a shaft that extends through a central opening in a second sun gear of the second planetary gear set; and
   wherein the ring gear in the first planetary gear set is coupled to the first set of pinion gears and the second set of pinion gears.

16. The multi-speed gearbox system of claim 15, wherein the first planetary gear set is a simple planetary gear set and the second planetary gear set is a dual-pinion planetary gear set.

17. The multi-speed gearbox system of claim 15, wherein the electric machine is arranged parallel to a differential that is rotationally coupled to the second planetary gear set.

18. The multi-speed gearbox system of claim 15, wherein the second planetary gear set includes a ring gear that is rotationally coupled to a differential via a final drive ratio.

* * * * *